United States Patent
Coleman (10) Patent No.: US 6,259,536 B1
(45) Date of Patent: Jul. 10, 2001

(54) COLOR PRINTING YIELDING A BACKGROUND DEPENDENT BLACK IMAGE (I.E. INTELLIGENT BLACK)

(75) Inventor: Robert M. Coleman, Altadena, CA (US)

(73) Assignee: Xerox Corporation, Stamford, CT (US)

( * ) Notice: Subject to any disclaimer, the term of this patent is extended or adjusted under 35 U.S.C. 154(b) by 767 days.

(21) Appl. No.: 08/579,386

(22) Filed: Dec. 27, 1995

(51) Int. Cl.[7] ............................... G03F 3/08; G06F 15/00
(52) U.S. Cl. .............................................. 358/1.9; 358/529
(58) Field of Search ..................................... 395/109, 131, 395/117; 358/529, 502, 501, 518, 504, 406, 296, 540, 530, 523, 524

(56) References Cited

U.S. PATENT DOCUMENTS

| | | | |
|---|---|---|---|
| 4,953,013 | * 8/1990 | Tsuji et al. | 358/530 |
| 5,113,356 | * 5/1992 | Nickell et al. | 395/131 |
| 5,168,552 | * 12/1992 | Vaughn et al. | 395/109 |
| 5,315,382 | * 5/1994 | Tanioka | 358/523 |
| 5,428,377 | * 6/1995 | Stoffel et al. | 347/15 |
| 5,475,800 | * 12/1995 | Vaughn et al. | 395/109 |
| 5,581,667 | * 12/1996 | Bloomberg | 358/540 |

\* cited by examiner

Primary Examiner—Cheukfan Lee (57) ABSTRACT

A digital color printing method and system is described which automatically detects when a black object is commanded to be printed, and changes the composition of the black color depending on the presence or absence of non-black colorants in the background color at the position on the page at which the edge of the black object is commanded to be printed. A single-color black object which is commanded to be printed at a position in which there is a previously rendered color background which contains non-black colorants will automatically have the composition of its black color changed from single-color black to process black composed of black plus non-black colorants such as cyan, magenta, and yellow. Conversely, a process black object which is commanded to be printed at a position in which the background does not contain non-black colorants will automatically have the composition of the black changed from process black to single-color black. For many printing systems the resulting prints exhibit fewer visual defects. Black objects printed on top of a color field are printed as process black and thereby exhibit a greater density and gloss and show fewer problems caused by the misregistration of separations or other printer defects, such as white fringes around the black objects. Conversely, black objects not on a color background are printed as single-color black objects and therefore do not exhibit objectionable process black problems such as color fringing, excessive colorant, and excessive gloss contrast with the background.

33 Claims, 8 Drawing Sheets

COLOR PRINTING YIELDING A BACKGROUND DEPENDENT BLACK IMAGE (I.E. INTELLIGENT BLACK)

BACKGROUND OF THE INVENTION

1. Field of the Invention

The present invention relates to digital color printing in which black objects and color objects are intermixedly printed, and more particularly, in which the composition of the black color for the black objects is automatically changed depending on the presence or absence of background color which contains non-black colorants.

2. Description of the Related Art

Digital color printers use a plurality of colorants, such as cyan, magenta, yellow, and black, to form images which appear to the human visual system to contain a multitude of colors In particular, the color black may be formed of equal or nearly equal combinations of cyan, magenta, and yellow. In practice, the black colorant is also often added to the combination of cyan, magenta, and yellow colorants to increase the maximum density and avoid problems of unwanted color. When black is formed with a mixture of some of cyan, magenta, yellow, and black, it is known as process black. The color black may also be formed by using the black colorant alone. In this case, it is known as single-color black.

Each type of black, process black and single-color black, have advantages and disadvantages when used in different contexts in the printing process.

When single-color black is used over a color field, it is often the case that the single-color black colorant has a gloss which is different from the gloss of the surrounding color field, and the gloss difference can be objectionable. Further, the maximum density of the single-color black colorant is often not as great as the maximum density obtainable with process black, and the density difference is particularly noticeable on certain color backgrounds. Also, the ink coverage or toner pile height of single-color black may be noticeably less than that of the surrounding color background. Finally, the presence of misregistration between the plurality of separations during the printing process, or the presence of other interactions between the separations, can result in objectionable white or light-colored fringing around a single-color black object on a color background. This occurs for example if the single-color black colorant is not printed precisely and without distortion into the hole left at that position when printing the other separations.

On the other hand, when process black is used in a white or grey field which does not contain any non-black colorants, slight misregistrations or interactions among the plurality of separations can result in objectionable color fringing at the edges of the object. Furthermore, the use of multiple colorants to form process black can result in blurred edges, thickened objects, and objectionable amounts of ink or toner coverage.

These advantages and disadvantages of single-color and process black are known in the graphics arts industry, and knowledgable graphic artists attempt to design pages which utilize -the advantages and avoid the disadvantages. However, some situations, such as a black object placed only partially over a color field, or a color background which changes rapidly, or complex text or graphics over a complex color background, makes it difficult to avoid the printing problems associated with mixedly printing black and color. Furthermore, many pages not designed by a knowledgeable graphic artist can benefit from a method and apparatus to automatically create a background dependent black image.

U.S. Pat. No. 4,700,399 to Yoshida discloses a color image processing apparatus which has an edge detector and a control unit for controlling a black reproduction quantity for an edge according to an output from the detector. For edges, densities of color signals for yellow, magenta, and cyan are reduced in accordance with the edge quantity to increase black density.

U.S. Pat. No. 4,953,015 to Hayasaki et. al. discloses a method for printing a color image which makes it possible to obtain a higher density black. Black ink is placed first, and then a plurality of other inks such as cyan, magenta, and yellow are allotted according to a color matrix table and are superimposed on at least a portion of the black ink.

U.S. Pat. No. 5,241,396 to Harrington discloses a method for printing a color image which yields dense black images without thickened, blurred edges. A modified black bitmap is produced by eroding the edges on the original black bitmap. The modified black bitmap is used to instruct the printing of at least one other colorant and then the original black bitmap is used to print the black colorant to yield a dense black image.

These methods have in common the attempt to limit the blurring disadvantages of process black on a white background so that it can be used in place of single-color black. Instead of that approach, the current invention describes a printing method which uses knowledge of the background color to choose whether to print single-color black or process black in order to utilize at the appropriate time the advantages of each type of black.

OBJECTS AND SUMMARY OF THE INVENTION

One object of the present invention is to provide a method for determining and changing the type of black color to print when such a change would increase the gloss of the black color to better conform to the gloss of a color background.

Another object of the present invention is to provide a method for determining and changing the type of black color to print when such a change would increase the maximum density of the black color to better conform to the maximum density of a color background.

Another object of the present invention is to provide a method for determining and changing the type of black color to print when such a change would increase the total colorant coverage of the black color to better conform to the total colorant coverage of a color background.

Another object of the present invention is to provide a method for determining and changing the type of black color to print when such a change would decrease the objectionable printing defects caused by misregistration or interactions of the black color with a color background.

Another object of the present invention is to provide a method for determining and changing the type of black color to print when such a change would decrease the blurring, thickening, and color fringing at the edges of a black object when printed on a white background or a background with no non-black colorants.

Another object of the present invention is to provide a method for determining and changing the type of black color to print when such a change would decrease the total colorant coverage of a black object when printed on a white background or a background with no non-black colorants.

To achieve the foregoing and other objects and to overcome the shortcomings discussed above, a digital color printing method and system is provided which automatically detects when a black object is commanded to be printed, and changes the composition of the black color depending on the presence or absence of non-black colorants in the background color at the position on the page at which the black object is commanded to be printed. As objects are commanded to be printed, a detection operation detects if the objects are commanded to be printed in either a single-color-black color or a process black color. If so, a background determining operation is performed to determine a color which has previously been commanded to be printed at the location at which the black object is commanded to be printed. If the background color so determined is either white or contains no non-black colorants, and the type of black of the black object is process black, a color changing step is performed to change the process black to a single-color black. If the background determining operation determines that the background color contains non-black colorants, and the type of black of the black object is single-color-black, a color changing step is performed to change the singlecolor black to a process black.

BRIEF DESCRIPTION OF THE DRAWINGS

The invention will be described in detail in reference to the following drawings in which like reference numerals refer to like elements and wherein.

DETAILED DESCRIPTION OF THE PREFERRED EMBODIMENTS

Figure 1:
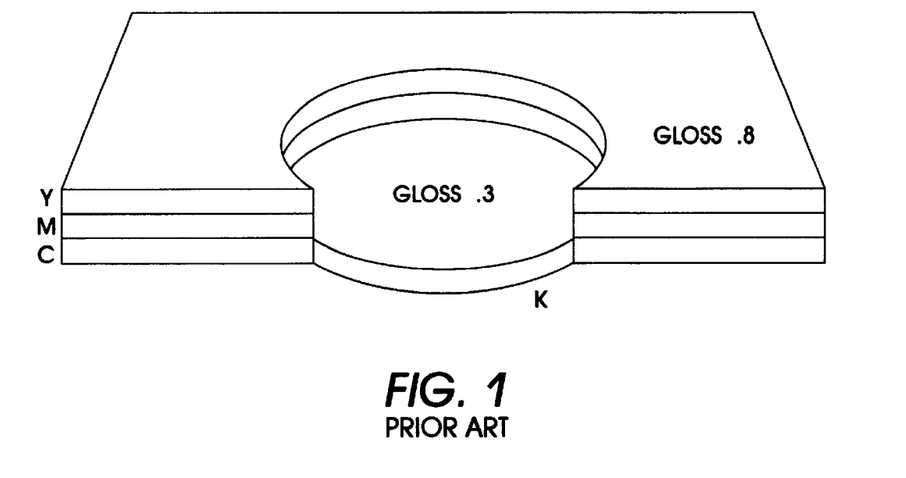
FIGS. 1–4 show various outputs produced by the prior art.
Figure 2:
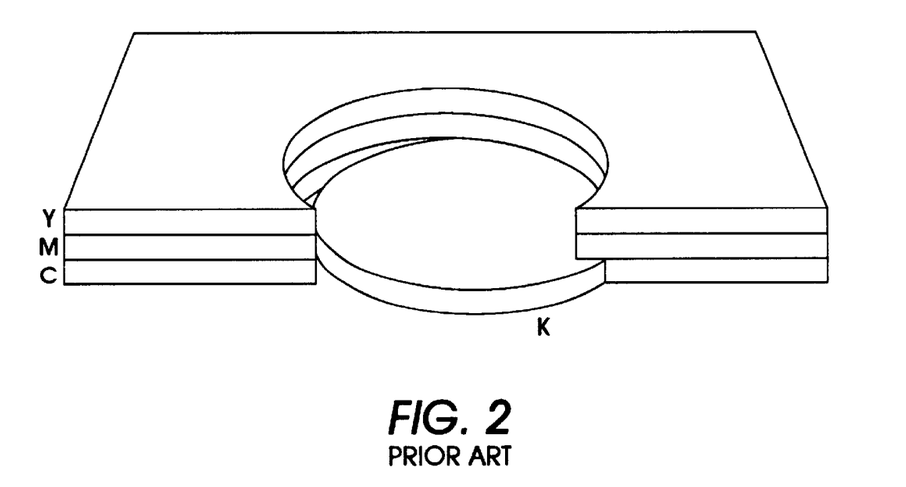

Referring now to the drawings, and particularly to FIG. 1 thereof, a black object is shown being imaged on top of a color field using only single-black colorant. As shown in FIG. 1, the single-color black can be seen to have a gloss level and coverage level (toner height, in the example shown) which may be objectionably different from the color background. It is not shown that a single-color black object may also have an inadequate maximum density when imaged on some color fields. A further problem is shown in FIG. 2, which also shows a black object being imaged on top of a color field using only single-black colorant. In this case, an objectionable white fringe can occur around part of the black object due to misregistration of the black object in relation to the surrounding color field.

Figure 3:
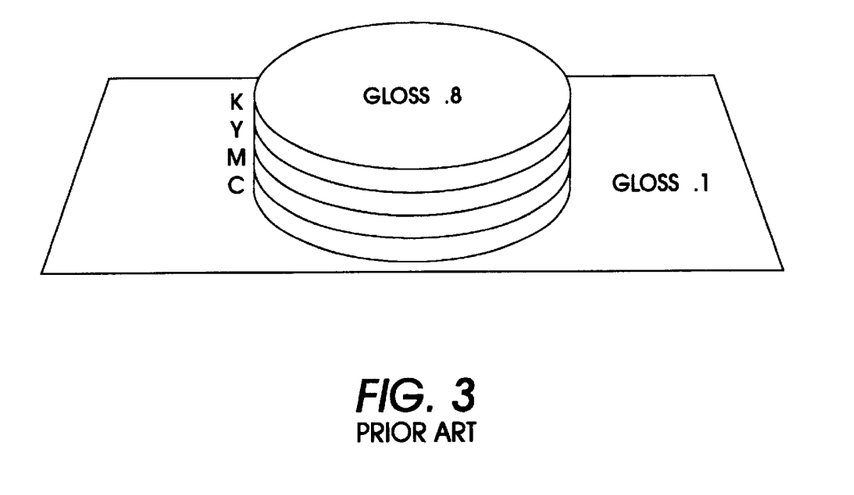
Figure 4:
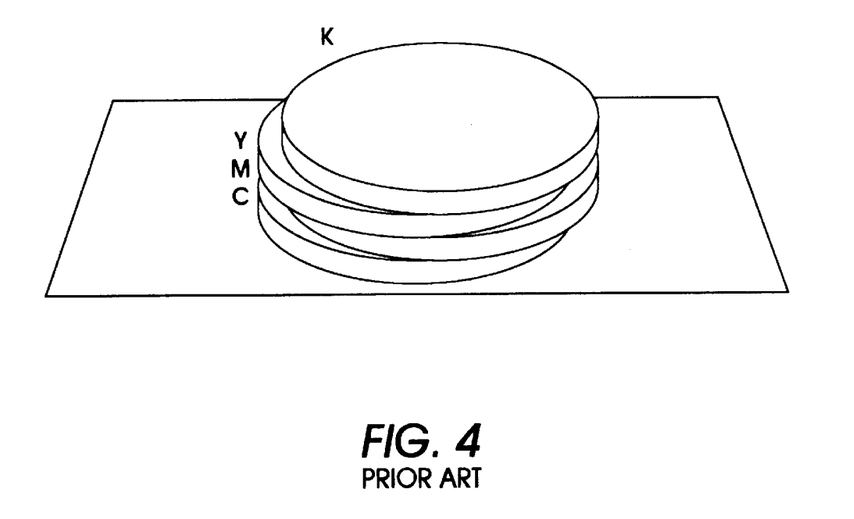

The opposite problems are shown in FIGS. 3 and 4. In FIG. 3, a black object is shown being imaged on top of a white paper background using process black composed of cyan, magenta, yellow, and black toners. As shown in FIG. 3, in certain printing systems, objectionable height differences can occur between the white background and the total pile height of all toners used in process black. Other problems with excess colorant coverage not shown in FIG. 3 can also occur, such as excessive bleeding and spread caused by excess ink in certain ink jet color printing systems. FIG. 4 shows a further problem with using process black on a white field. In this case, misregistration between the color separations during printing can cause an objectionable color fringing, blurring, and widening of the edges of a black object on a white background.

Figure 5:
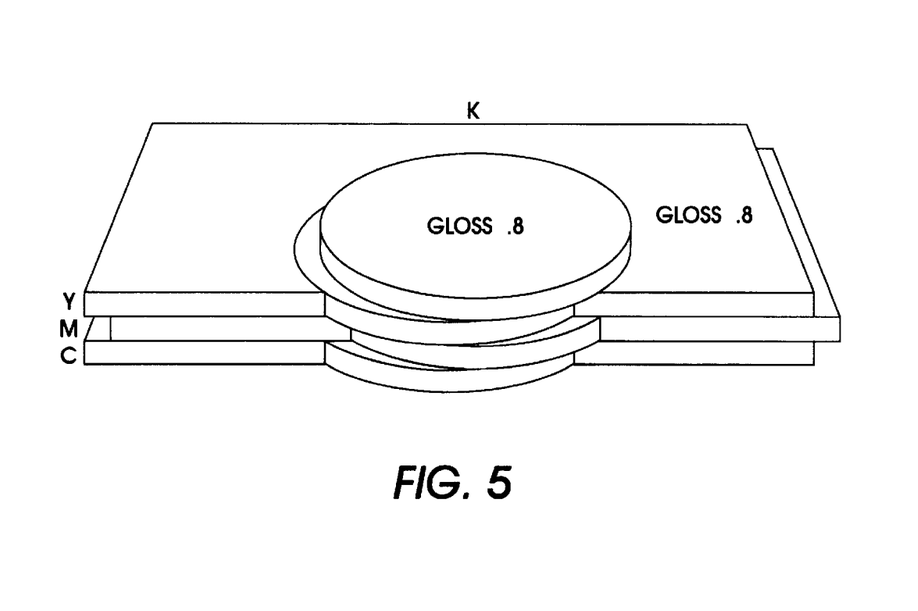
FIGS. 5–6 show various outputs produced by the method and system of this invention.

FIG. 5 shows how the current invention solves the problems shown in FIGS. 1 and 2 and other problems not shown which can occur when a single-color black object is printed on a color field. By detecting single-color black objects and changing the single-color black to a process black when it is being printed on a color field, the color remains black but the problems of insufficient gloss, density, and colorant coverage, and the problem of white fringes due to misregistration or other interaction between separations are solved.

Figure 6:
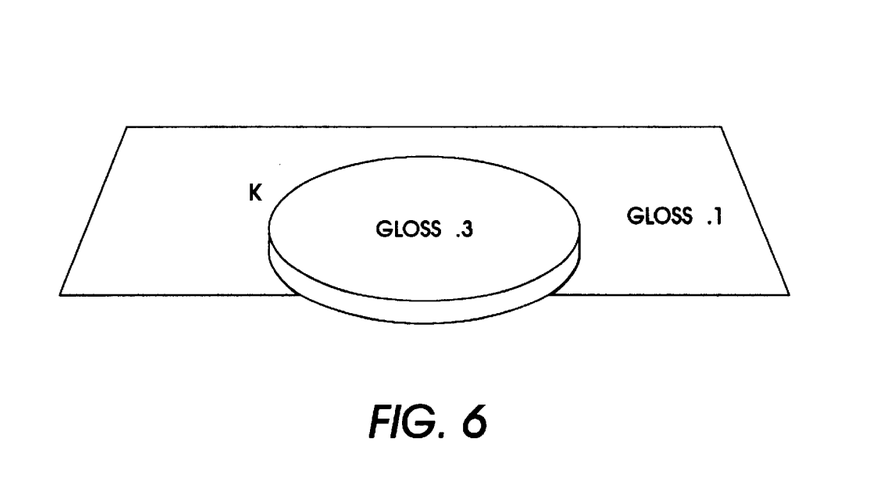

FIG. 6 shows how the current invention solves the problems shown in FIGS. 3 and 4 and other problems not shown which can occur when a process black object is printed on a white or single-color grey background. By changing the process black object to a single-color black object, the color remains black but the problems of excessive colorant coverage, and the problem of color fringes due to misregistration or other interaction between separations are solved.

Figure 7:
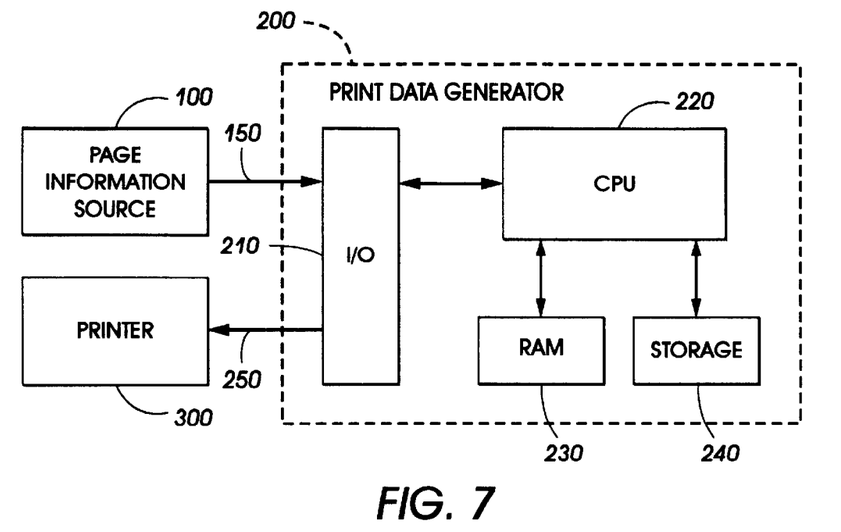
FIG. 7 is a block diagram of an apparatus made according to and for practicing the method of the invention, in which the changes to the color of black objects takes place within the print data generator.

Referring now to FIG. 7, a generalized page printing system made according to the present invention is shown. It includes a page information source 100 connected via communication link 150 to a print data generator 200. Generator 200 is connected to a printer 300 via a communication link 250. Generator 200 includes an I/O controller 210, a CPU (central processing unit) 220, a RAM 230 which can store program and data information, and a storage apparatus 240 for non-volatile storage. These devices 210–240 may be any of a number of conventional devices generally available. Other hardware that accomplish the same functions can be used. As will be seen, various embodiments are realizable from this general structure.

Typically, page information source 100 may be a conventional work station or other computer system such as an IBM PC or Apple Macintosh. Communication link 150 may be a part of a computer network or a dedicated link. Print data generator 200 is usually a dedicated computer attached to a printer 300 such as one of many electromechanical devices responsive to raster data for producing a printed page. Many other configurations are possible. For example, generator 200, programmed to function as described herein, could also be incorporated together in the same computer running the page source 100 software. In this case of shared computer hardware and separate software, the functions of page information source 100 and print data generator 200 remain distinct. The methods as described herein remain applicable through a wide range of apparatus configurations.

FIG. 7 shows an embodiment in which the print data generator 200 is programmed to carry out the methods described herein and shown in FIGS. 9–12. In this case, a page representation is received from conventional page source 100. The page representation may be a conventional page description language such as the language available from Adobe Systems Incorporated known as PostScript, or an equivalent. In the page representation received from the page source 100, objects such as text, graphics, or pictures can be created and placed on the page in arbitrary order. The objects are defined by descriptive commands, some of which control the location, shape, orientation, and size of an object. At least one command controls the color of an object. An object's color may include neutral colors such as black and grey. Objects may overlap each other, and a priority method determines which objects are on top of other objects.

As further discussed herein, when a page representation is received from a conventional page source 100 by print data generator 200 and generator 200 is programmed to carry out the method of this invention, generator 200 may in certain situations modify the output commanded by the page representation. As described herein, generator 200 may change the composition of the color of a black object contrary to the command of the page representation before merging it into the generated print data. Thus, the page as sent by a conventional page information source 100 will be printed differently than described, in order to accomplish the objectives of this invention for improving print quality. The advantage of this configuration is that page representations received from any number and variety of conventional page sources 100 may be automatically modified by generator 200 to print with higher quality.

Figure 8:
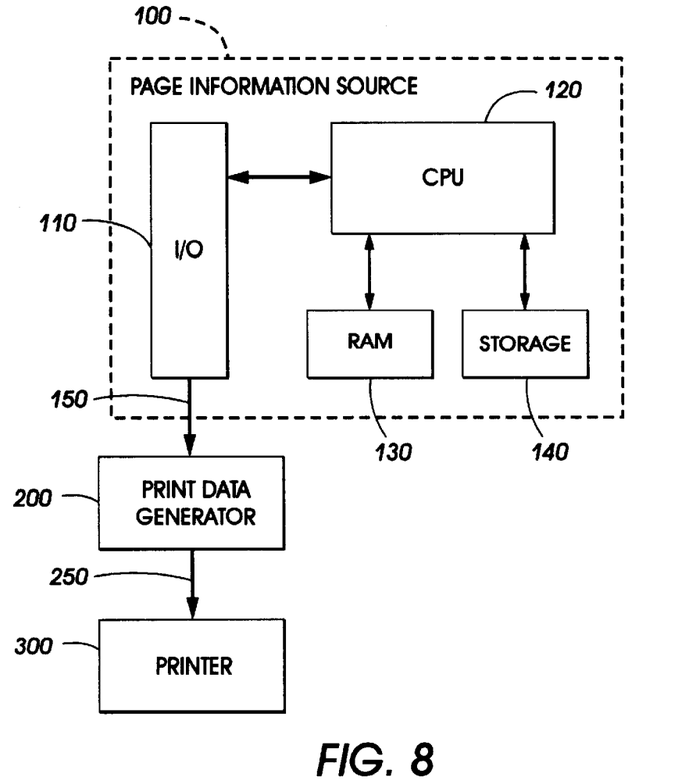
FIG. 8 is a block diagram of an apparatus made according to and for practicing the method of the invention, in which the changes to the color of black objects takes place within the page information source.

In FIG. 8, a different apparatus and configuration is shown. In this case, the page information source 100 includes resources such as I/O controller 110, CPU 120, RAM 130, and storage 140 which allow page source 100 to be programmed to carry out the methods of the invention described herein. In this apparatus, before a page representation is sent via communication link 150 to a conventional print data generator 200, the methods of this invention are applied in order to produce a page representation which achieves the objectives of this invention by commanding a background dependent black image. In this configuration, the print data generator 200 may be conventional and the page information source 100 is programmed according to the methods of this invention. The advantage of this configuration of apparatus is that the page representation, which has been modified according to this invention to command a background dependent black image, will be printed with higher quality by any conventional print data generator 200 and printer 300.

Figure 9:
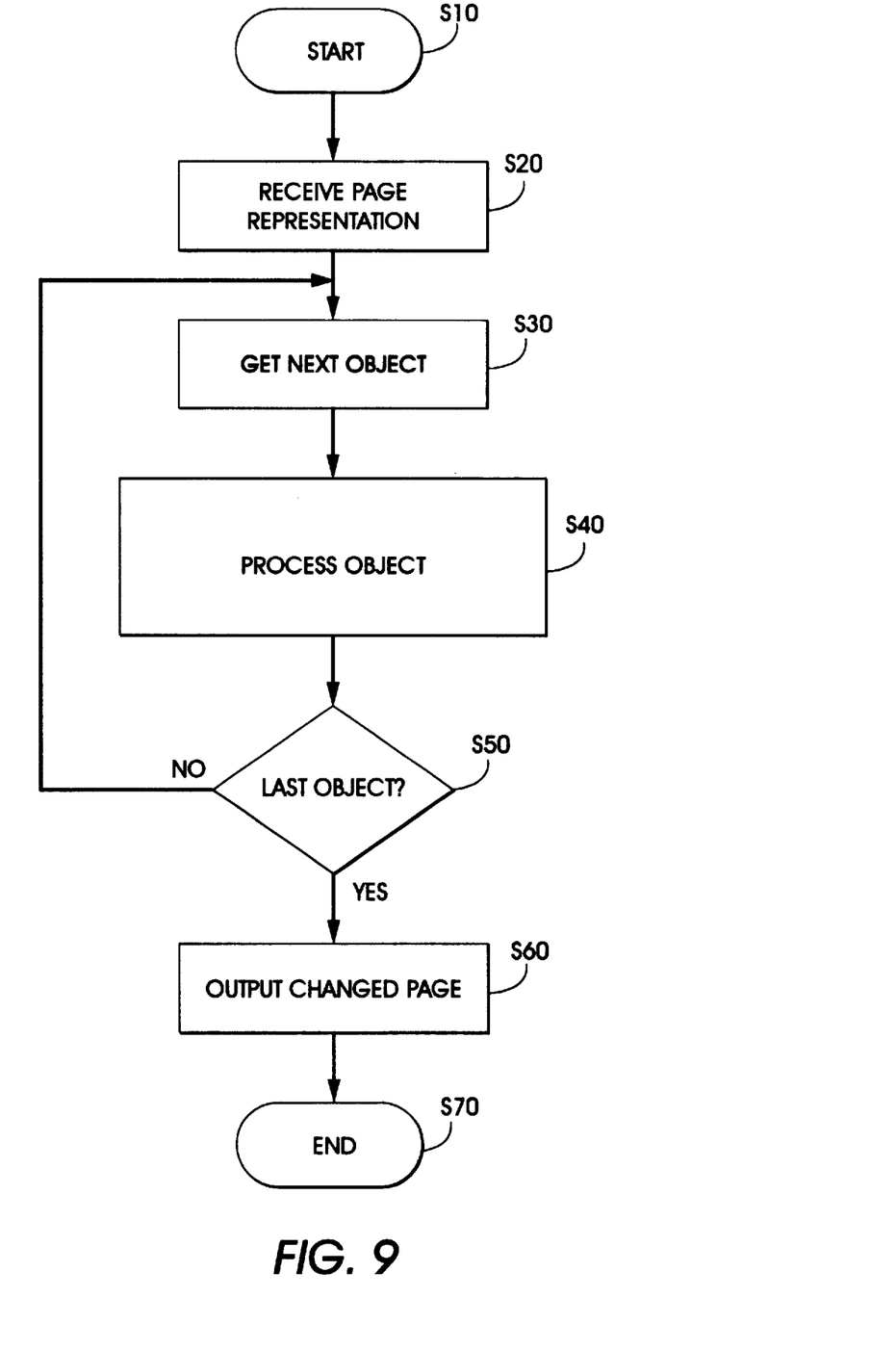
FIG. 9 shows a flowchart for the overall method by which a document is changed to produce a background dependent black image.

FIG. 9 illustrates a generalized flow diagram of a process or method according to the invention by which a background dependent black image is formed. After starting in step S10, in step S20 a page representation is received. This page representation represents a collection of colored objects in a data format such as a conventional page description language or equivalent data format as previously described.

In step S30, the next object which has not yet been processed is retrieved from the page representation. This retrieved object is further processed in step S40 as will later be described in greater detail. In step S50, it is determined if this is the last object to be retrieved from the page description language. If it is not the last object, then control returns to step S30 where the next object is retrieved. Otherwise, if this is the last object defined by the page description language, control flows to step S60 where the document, which has possibly been changed during the object processing step S40, is output.

The form of the outputted changed document of step S60 depends on where the changes according to the methods of this invention have been made. For example, in the apparatus as described in FIG. 8, in which the methods of this invention are implemented within the page information source 100, the outputted changed document can be in the form of a modified page description language or equivalent internal data structure which commands a background dependent black image. This page description language would, if sent to a conventional printing system, print an image whose black composition is dependent on the background color in accordance with the objects of this invention. In this case, the modifications would take the form of substituting existing black color commands for new black color commands which command the correct form of black.

Alternatively, as for example in the apparatus as described in FIG. 7, in which the methods of this invention are implemented within the print data generator 200, the output step of step S60 can be in the form of a printable page data structure such as a set of bitmaps, pixel maps, or other intermediate data structure which is in a form acceptable for use by a raster color printer. In this case, the output step involves outputting the modified print data to a network, a printer or a storage device. The output step could also be a hybrid output consisting for example of a page description language which incorporates a printable data structure such as a byte map. For the purposes of this invention, the output for the changed document could assume any number of equivalent forms. Finally, control flows to step S70, where the process ends.

Figure 10:
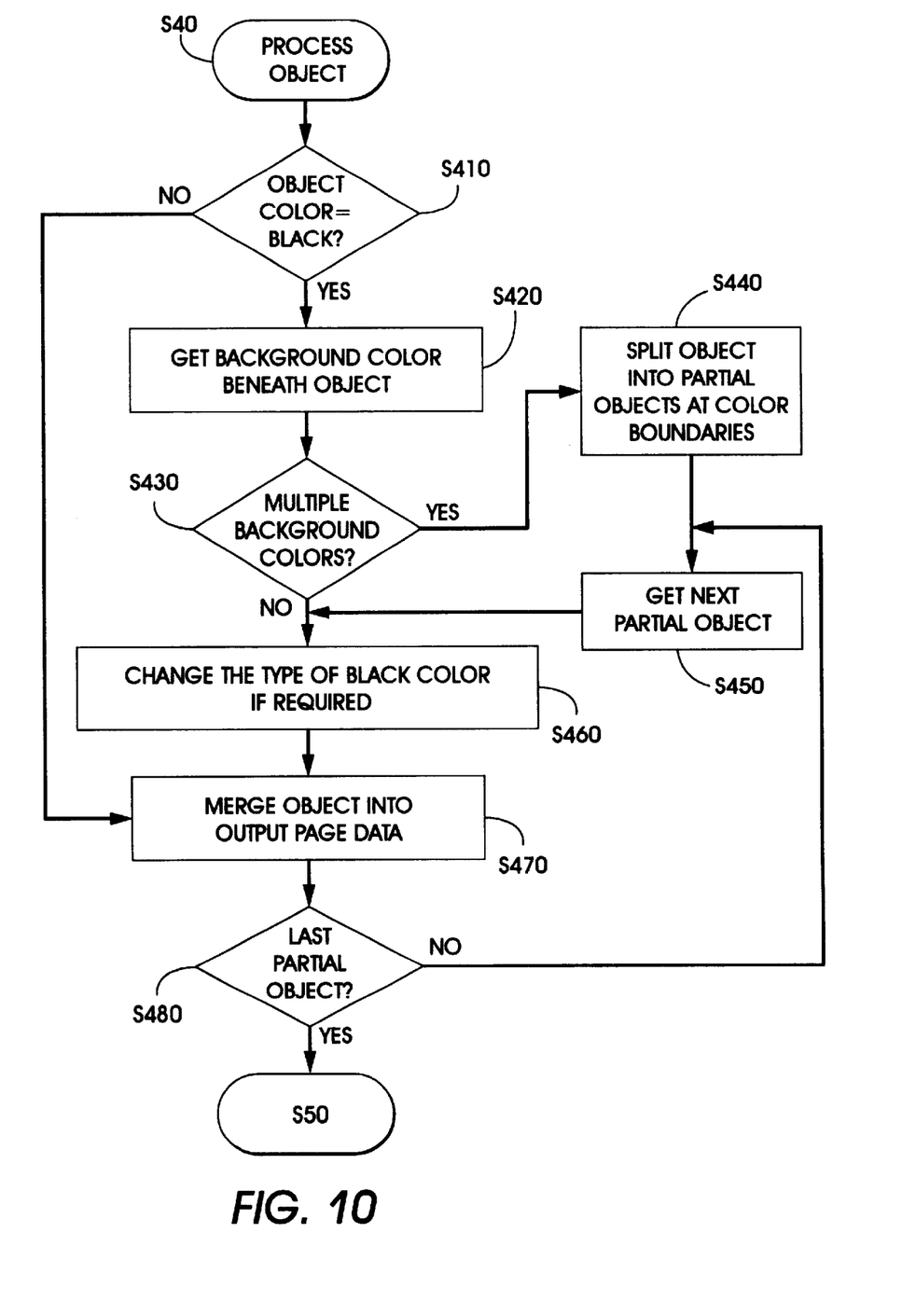
FIG. 10 shows the method by which each object is processed before being merged into the output data.

FIG. 10 shows the step S40 of processing an object in greater detail. In step S410, the color of the object to be processed is examined. The color of an object can be expressed in many color spaces or systems. However, in any color space it is possible to efficiently determine if the color black has been commanded. For example, some systems use an RGB color space, and black is generally defined in such systems as R=G=B=0. Other systems express colors as combinations of cyan (C), magenta (M), yellow (Y), and black (K). In such systems, black may be defined as C=M=Y=1, or alternatively as C=M=Y=K=1 (two forms of process black), or alternatively as K=1 (single-color black). Some systems allow many color spaces to be used intermixedly, but in each case it is possible to define what combinations of the components of each color space will result in the color black being output.

If in step S410 the object color is not black, control flows immediately to step S470, in which the object is merged into the output page data. This output page data can take many forms depending on the particular printing system within which this invention is embodied. The output page data, at each moment, represents the collection of objects already processed whose color need not be further modified by the method of this invention, collectively represented in an intermediate form which is preparatory to the already described document outputting step of step S60. For example, the output page data could be in the form of a pixel map containing a raster of color data for each pixel on the page to be printed, or an intermediate form such as a display list describing the ordered list of colored objects for each scan line in the final page. The merging of an object into such an output page data is a conventional step which involves adding the object to the intermediate form output page data in such a way that it will be printed in the correct location, with the correct shape, with the correct relation to other objects on the page, and with the correct color.

Returning to step S410, if the object color is found to be black, the processing proceeds to step S420 where the background color which is beneath the object is obtained. If the output page data referred to in step S470 consists of a pixel map, that is a raster of pixels for each printable location on the page, then the step of getting the background color beneath the object consists of reading the set of pixels found within the shape defined by the black object currently being considered. If the output page data consists instead of a display list such as a list of objects per scan line, ordered by position on each scan line and with information controlling the positional layer of each object, then the step of obtaining the background color consists of finding the object or objects already processed whose position along the scan line determines that they would be beneath the currently considered black object, and obtaining the color of said objects. If the object consists of shape information such as a bitmap which defines the on and off portions of the image, and color information which assigns a color to the on bits (foreground) and off bits (background) of the object, then the background color is determined by examining the color associated with the off bits of the shape-defining bitmap.

Figure 11:
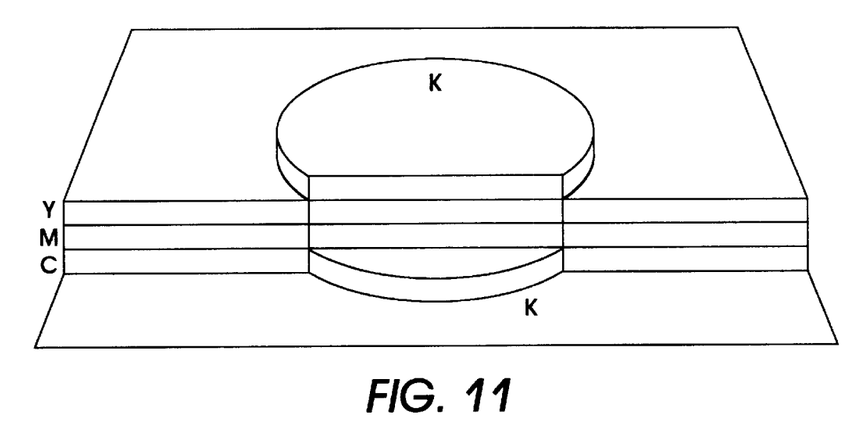
FIG. 11 illustrates an output in which a black object is printed over a color boundary and is thereby printed as multiple partial objects, with each partial object having a different type of black.

In any of the above cases, if an object is found to have two or more background colors within its shape, the control may flow to step S440, where the object is split into multiple objects whose edge boundaries follow the edge boundaries of the multiple background colors. The result of this splitting step is that each object or partial object contains one background color which may be analyzed to determine whether the type of black currently being used is correct. Thus as shown in FIG. 11, the composition of black for an object which extends over the boundary of a color field may be made to change within the boundaries of the object at the edge of the color background beneath the object. The partial object which is over the color field may be imaged as process black, and the partial object which is for example overwhite paper may be imaged as single-color black.

From step S440, control flows to step S450, where the next partial object from the list of partial objects generated in splitting step S440 is chosen for further processing.

It will be appreciated that if it is determined that the splitting step S440 is not efficient to perform and it is preferable to treat objects as whole objects regardless of transitions of background color beneath an object, said steps S430, S440, and S450 need not be performed. In this case, it is clearly possible to choose one of multiple background colors beneath a whole black object and use that background color as the background color for the entire object in performing the steps S460 and following.

In step S460, it is determined according to the method of the invention whether it is necessary to change the type of black color of the object or partial object currently being processed, and if it is determined to be necessary, the type of the black object or partial object is changed to the appropriate one of single-color black or process black. Step S460 will be explained in further detail later.

Then, control flows to step S470 where, as previously described, the processed object or partial object is merged into the output page data in such a way that it will be printed in the correct location, with the correct shape, with the correct relation to other objects on the page, and with the correct color which has possibly been changed in previous step S460. After merging, it is determined in step S480 whether this is the last partial object of the partial object list which was generated in step S440. If this is the last partial object, or if the splitting steps S430–S450 were not performed but rather whole objects are being processed, then control flows to step S50, which was previously described. If this is not the last partial object in the list of partial objects generated in step S440, control returns to step S450, where the next partial object is fetched and processing continues with steps S460 and following on that partial object as previously described.

Figure 12:
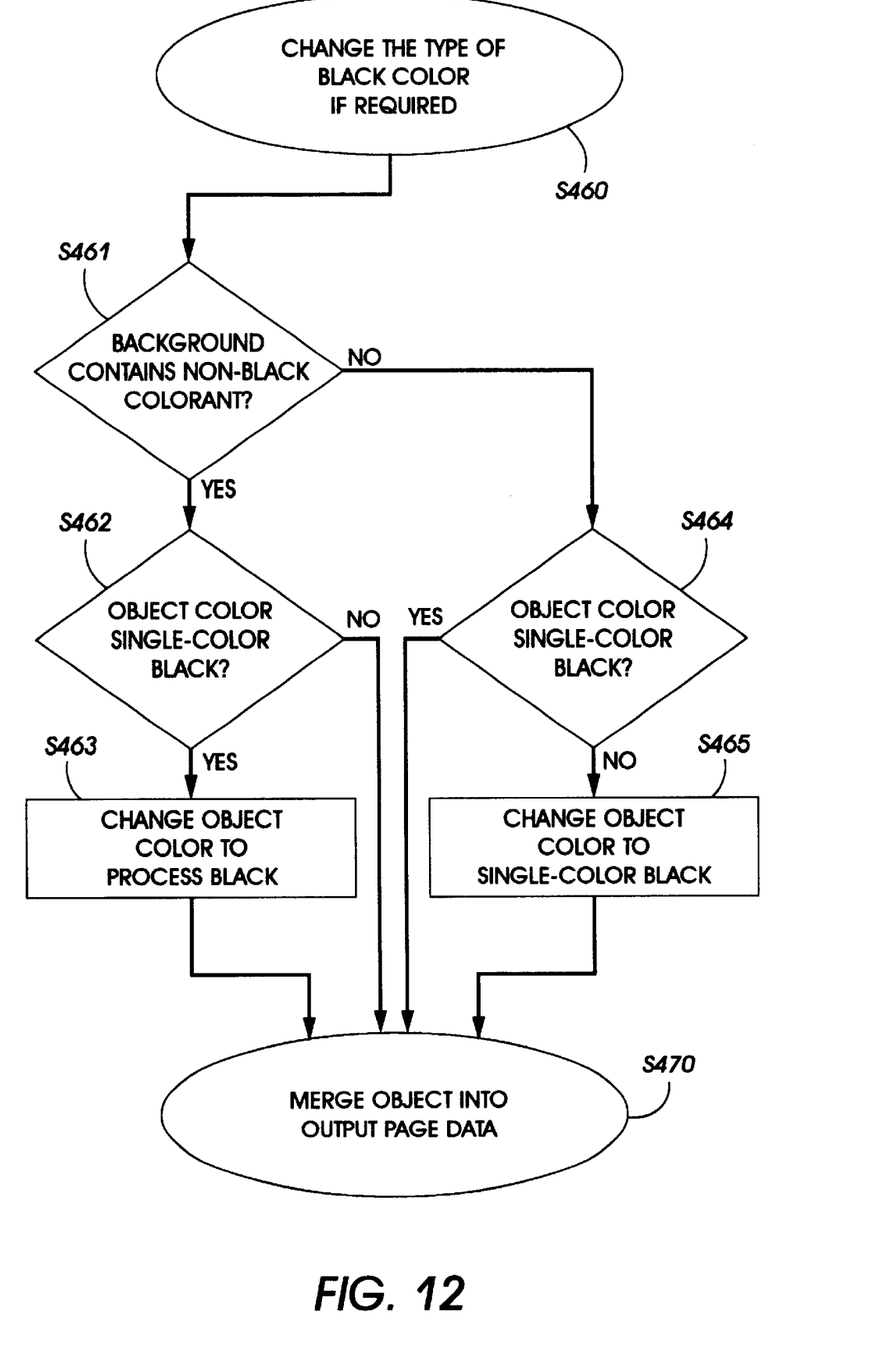
FIG. 12 shows the method by which the determination is made to change the type of black color for a black object based on the black object and its background color.

FIG. 12 shows in greater detail the step S460 of changing the type of black color if required. In step S461, the background color or section thereof which was fetched in step S420 and possibly split into multiple sections by steps S430–S450 is analyzed to determine if it contains any non-black colorant. It is normally true that by the time an object is merged into the output page data in step S470, its color coordinates will have been converted to match the color separations of the output device, most generally CMYK (cyan, magenta, yellow, black). In this case, the background color as fetched from the output page data containing objects which have been previously processed for printing will generally have its color expressed in CMYK coordinates. Therefore, the simple test of C=M=Y=0 will determine whether the background contains any non-black (C, M, or Y) components. If, for certain output devices, the color is maintained in a different color space, it is still possible to efficiently determine if the background color is white, black, or grey (ie, neutral). For example, in the L*a*b* color space, the test a*=b*=0 will indicate a neutral color, and in the R1B space, the test R=G=B indicates a neutral color. In these cases of color spaces other than CMYK, however, additional system information is needed to determine how such colors will be rendered in CMYK, since the concepts of process black or single-color black only have meaning in the CMYK or similar process space. In the preferred embodiment, therefore, in order to avoid the necessity of additional tagged information with each color, it is preferable that the color of objects be transformed into CMYK as part of the merging step S470. In this way, the test in step S461 of analyzing the background color for non-black colorants is reduced to the simple test of C=M=Y=0.

If in step S461 the background color is found to contain non-black colorants, then in step S462 it is determined if the black colored object being currently processed is a single color black. This test is also simple and efficient. If the color space of the black object is CMYK, and C=M=Y=0 and K>=1 (where 1represents the defined value of K which constitutes full black), then the black object currently being processed is a single-color black. If it is a single-color black, control passes to step S463, where the single-color black is changed to a process black. One way to perform this step is simply to substitute for the color of the current object a CMYK value which produces a correct process black on the output system being used. Now that the color has been changed to a process black, the current object being processed may be merged, in step S470, into the output page data so as to print in the correct location, with the correct shape, with the correct relation to other objects on the page, and with the corrected black color. If, in step S462 the black object being processed is determined not to be a single-color black object, then the color need not be changed and processing may pass immediately to merging step S470.

Returning to step S461, if the background color is not found to contain non-black colorants, ie, it is a background composed of white paper or black colorant only, then in step S464 it is again determined if the object being processed is a single-color black object, using the same test mentioned above. If it is determined that it is not a single-color black object, then in step S465 the color of the object is changed to be a single-color black object. One way to perform this step is simply to set the color of the object currently being processed to the CMYK value which creates a single-color black, which normally is defined as C=M=Y=0 and K=1. If, in step S464 it is determined that the current black object is already a single color black, then no change is needed and control passes immediately to merging step S470 as described above.

It will be appreciated that as an alternative embodiment which may be more efficient for some computing apparatus and output page data, after the test for non-black colorants in the background color in step S461 the correct form of black color could be set for each black object without testing in steps S462 and S465 whether the black color is already correct. Thus, every black object would have its color set to the correct type whether it was previously already correct or not. This method is equivalent to the method above described and avoids the testing steps S462 and S465 but uses the setting steps S463 and S465 for each black object.

While this invention has been described in conjunction with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. In a system which uses electronic signals to specify black and non black colorants to be used in a printing process to print a black area over a background area, a method for determining colorants to be used to print said black area comprising the steps of:

testing said signals to determine if the background is to be printed using a non black colorant, if a non black colorant is to be used to print the background, generate a signal specifying that said black color will be printed using a first black color, and if no non black colorants are used to print the background, generate a signal specifying that said black color will be printed using a second black color, and printing said black area.

2. The system of claim 1 wherein said first black color contains a non black colorant.

3. The system of claim 1 wherein said second black color does not contain a non black colorant.

4. In a system which uses electronic signals to specify black and non black colorants to be used in a printing process to print a black area over a background area, a method for determining colorants to be used to print said black area comprising the steps of:

testing said signals to determine if the background is to be printed using a non black colorant, if a non black colorant is to be used to print the background, generate a signal specifying that said black color will comprise a non black colorant, and printing said black area.

5. The system of claim 4 wherein if there is no non black colorant to be used to print the background, generate a signal specifying that said black color will comprise only black colorant.

6. In a system which uses electronic signals to specify black and non black colorants to be used in a printing process to print a black pixel over a background pixel, a method for determining colorants to be used to print said black pixel comprising the steps of:

testing said signals to determine if the background is to be printed using a non black colorant, if a non black colorant is to be used to print the background, generate a signal specifying that said black pixel will comprise a non black colorant, and printing said black pixel.

7. The system of claim 6 wherein if there is no non black colorant to be used to print the background, generate a signal specifying that said black pixel will comprise only black colorant.

8. A method for forming from electronic signals and printing a background color dependent black image comprising a number of black objects, said method comprising the steps of:

providing two types of black color with differing compositions of colorants for said black objects, receiving data defining a page representation comprising a number of black and background objects, identifying data corresponding to each black object, retrieving a background color at the location of each black object, determining according to the retrieved background color which of the provided two types of black to use to color each black object, merging said determined black objects and said background objects in the page representation into an output data, and printing said output data.

9. A method according to claim 8 including storing said output data.

10. A method according to claim 8 including transmitting said output data to a visual output device.

11. A method according to claim 8 wherein said output data comprises a page description language.

12. A method according to claim 8 wherein said output data comprises a plurality of rasters, each raster encoding the values to be output at each point on the page for a color separation.

13. A method according to claim 12 wherein said color separations comprise black and one non-black colorant.

14. A method according to claim 13 wherein said one non-black colorant comprises cyan, magenta, or yellow.

15. A method according to claim 8 wherein the two types of black color consist of single-color black comprised of only black colorant and process black comprised of two colorants.

16. A method according to claim 15 wherein said process black comprises black colorant.

17. A method according to claim 8 wherein said determining step comprises selecting a first type of black whenever the background color contains no non-black colorants and otherwise selecting a second type of black.

18. A method according to claim 8 wherein said first type of black consists of black colorant and said second type of black comprises non black colorants.

19. A method for forming from electronic signals and printing a background color dependent black image comprising a number of black objects, said method comprising the steps of:

providing two types of black color with differing compositions of colorants for said black objects, receiving data defining a page representation comprising a number of black and background objects, identifying data corresponding to each black object, retrieving a background color at the location of each black object, determining according to the retrieved background color which of the provided two types of black, to use to color each black object, changing the type of black only when the determined type is not the same as the provided type, merging said determined black objects and said background objects in the page representation into an output data, and printing the output data.

20. A method for forming from electronic signals and printing a background color dependent black object, said method comprising the steps of:
- providing two types of black color with differing compositions of colorants,
- receiving data defining a page representation comprising said black objects and background areas,
- identifying data corresponding to the black object,
- splitting the black object into a plurality of partial black objects, each partial black object having a different background color from the other partial objects,
- determining according to the retrieved background color of each partial black object which of the provided two types of black to color each partial black object,
- merging all objects and partial objects in the page representation into an output data, and
- printing said output data.

21. A method according to claim 20 including storing said output data.

22. A method according to claim 20 including transmitting said output data to a visual output device.

23. A method according to claim 20 wherein said output data comprises a page description language.

24. A method according to claim 20 wherein said output data comprises a plurality of rasters, each raster encoding the values to be output at each point on the page for a color separation.

25. A method according to claim 24 wherein said color separations comprise one black and one non-black colorant.

26. A method according to claim 25 wherein said non-black colorant is cyan, magenta, or yellow.

27. A method according to claim 20 wherein said two types of black color consist of single-color black comprised of only black colorant and process black comprised of two non black colorants.

28. A method according to claim 20 wherein said process black additionally comprises black colorant.

29. A method according to claim 20 wherein said determining step comprises selecting a first type of black whenever the background color contains no non-black colorants and otherwise selecting a second type of black.

30. A method according to claim 20 wherein said first type of black consists of black colorant and said second type of black comprises non black colorants.

31. A method for forming from electronic signals and printing a background color dependent black object, said method comprising the steps of:
- providing two types of black color with differing compositions of colorants,
- receiving data defining a page representation comprising said black objects and background areas,
- identifying data corresponding to the black object,
- splitting the black object into a plurality of partial black objects, each partial black object having a different background color from the other partial objects,
- determining according to the retrieved background color of each partial black object which of the provided two types of black to color each partial black object,
- changing the type of black only when the determined type is not the same as the provided type,
- merging all objects and partial objects in the page representation into an output data, and
- printing said output data.

32. A system for producing and storing a modified page representation from electronic signals comprising an original page representation containing a black color over a background color, the system comprising:
- input means for inputting said electronic signals;
- data memory means for storing data representative of the modified page representation;
- computer means including program memory means for storing computer program instructions and processing means coupled to the input means, data memory means, and program memory means, for executing the stored program instructions, the processing means being responsive to input data for
  - (a) testing said signals to determine if the background color is to be printed using a non black colorant,
  - (b) if a non black colorant is to be used to print the background color, generating the modified page representation specifying that said black color will be printed using a first black color,
  - (c) if no non black colorants are to be used to print the background color, generating the modified page representation specifying that said black color will be printed using a second black color, and
  - (d) storing said modified page representation to said data memory means.

33. A system for receiving electronic signals comprising an original page representation containing a black color over a background color, and printing said page representation in modified form, the system comprising:
- a printing device;
- input means for inputting said electronic signals;
- computer means including program memory means for storing computer program instructions and processing means coupled to the input means and program memory means for executing the stored program instructions, the processing means being responsive to input data for
  - (a) testing said signals to determine if the background color is to be printed using a non black colorant,
  - (b) if a non black colorant is to be used to print the background color, generating a signal specifying that said black color will be printed using a first black color,
  - (c) if no non black colorants are to be used to print the background color, generating a signal specifying that said black color will be printed using a second black color, and
  - (d) transmitting said generated signals to the printing device;
- the printing device being responsive to the transmitted signals for printing the page representation in modified form.

* * * * *